J. F. WINCHELL.

DETACHABLE LEVER FOR FORGES.

No. 10,593. Reissued May 5, 1885.

WITNESSES

Philip C. Masi.

Grace M. Craig.

INVENTOR

James F. Winchell, by Anderson & Smith his ATTORNEYS

N. PETERS, Photo-Lithographer, Washington, D. C.

UNITED STATES PATENT OFFICE.

JAMES F. WINCHELL, OF SPRINGFIELD, OHIO.

DETACHABLE LEVER FOR FORGES.

SPECIFICATION forming part of Reissued Letters Patent No. 10,593, dated May 5, 1885.

Original No. 296, 266, dated April 1, 1884. Application for reissue filed March 31, 1885.

*To all whom it may concern:*

Be it known that I, JAMES F. WINCHELL, a citizen of the United States, of Springfield, in the county of Clark and State of Ohio, have invented certain new and useful Improvements in Levers for Forges; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

Figure 1:
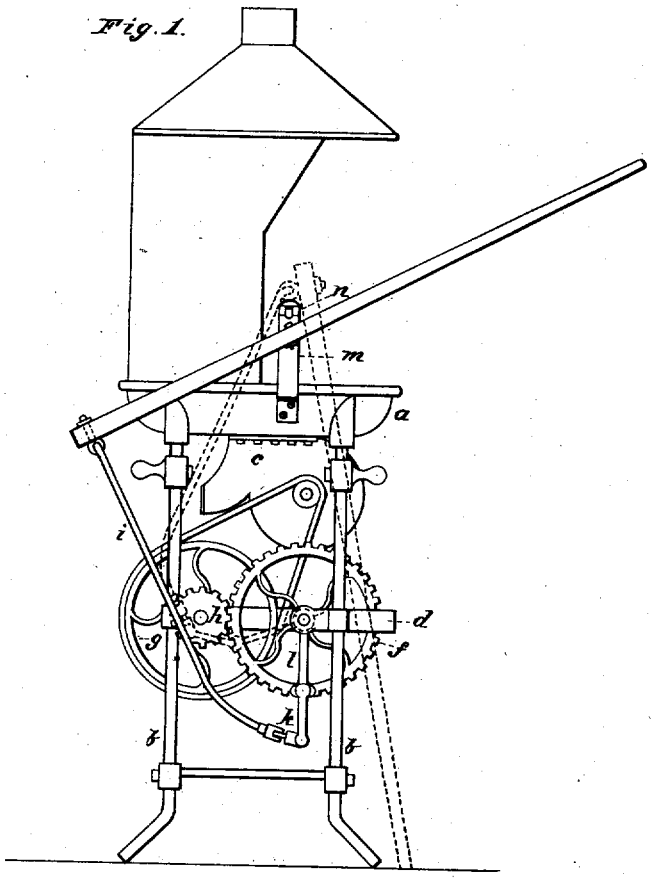
Figure 2:
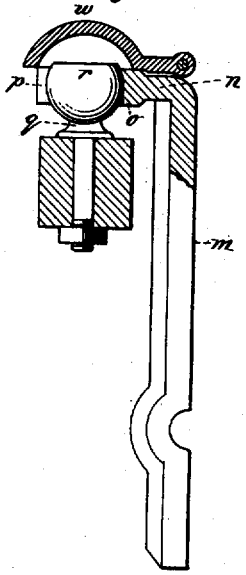
Figure 3:
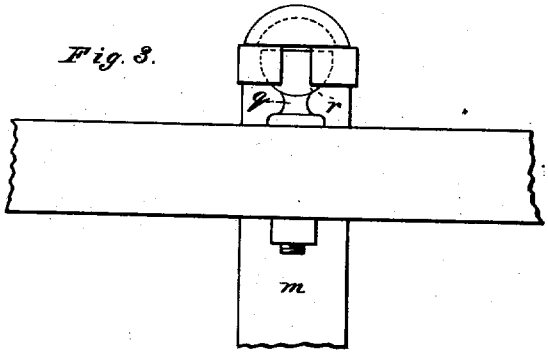

Figure 1 is an end elevation of the forge. Fig. 2 is a sectional view of the lever and ball-and-socket joint. Fig. 3 is a detail view.

This invention has relation to portable forges wherein hand-levers are employed; and it consists in the construction and novel arrangement of devices, as will be hereinafter fully described, and particularly pointed out in the claims appended.

In the accompanying drawings I have shown my improved lever attached to a portable forge.

Referring by letter thereto, *a* designates the top plate of the forge mounted on the legs *b*, and *c* designates the fan-case.

*d* indicates the bracket furnishing the bearings for the drive-wheel *f*, the band-wheel *g*, and pinion *h*.

*i k l* designate the clutch-dog and its connections leading to the lever. These parts may be varied at will, the gist of the invention being in the lever and its fulcrum, which I will now describe.

*m* designates the bracket secured to one side of the top plate of the forge, and provided in its horizontal arm *n* with a socket, *o*, open above and below, and having a recess, *p*, in its outer wall.

The stem *q* of the ball portion *r* of the ball-and-socket fulcrum is entered to its seat through the recess *p* in the socket *o*. The shank of the ball portion of the fulcrum may be secured to the lever in any suitable manner. The "ball portion" *r*, as it is termed, is preferably made nearly hemispherical and hollow, for the reason that it is more easily annealed in this form, and is sufficiently strong, while lighter than if made solid; but I may make it spherical and solid, if I desire, and do sometimes make it so. A hinged cap, *w*, is secured to the bracket in a position to cover the joint, to exclude dust, &c., to permit the joint to be oiled, and to permit also the removal of the ball from the socket. A lever provided with this ball-and-socket fulcrum will not twist and turn in the workman's hands while being operated, and may be given a universal motion. The lever is intended to be detached from the socket when not in use, and hung upon the bracket, as shown; but it cannot be accidentally detached by any of the motions necessary to operate it when driving the mechanism to which it is connected. To lift the ball from the socket to detach the lever, the lever must be brought to a horizontal plane at right angles to the horizontal arm *n* of the bracket, and then carried outwardly and upwardly from a point vertically beneath the socket on the arc of a circle a distance of ninety degrees, when it may be lifted out of the socket, the stem passing up through the recess *p*. A reverse operation is followed to replace it in the socket.

The motion required to operate the lever is natural and easy, and the lever may be detached from its socket and hung upon the bracket when not in use, which is a great convenience when the lever is long, as it must be where great power is required.

Having described my invention, what I claim, and desire to secure by Letters Patent, is—

1. The combination, with a portable forge, of a lever and detachable connections forming the fulcrum thereof, whereby the lever is made capable of universal motion, and is immediately detachable from its bearing, substantially as specified.

2. A forge having a lever connected thereto by a ball-and-socket fulcrum in which the ball portion is detachable from the socket, substantially as specified.

3. The combination, with a forge, of a lever having an open socket-seat, and a ball-and-stem portion attached to the lever and removable from the socket-seat, substantially as specified.

4. In a forge, a lever connected at its weight end to the mechanism to be driven, and provided with a ball-and-socket fulcrum in which the ball-and-stem portion is removable from the socket-seat, substantially as specified.

5. In a forge, a lever provided with a separable fulcrum, whereby the lever may be given an elliptical motion, substantially as specified.

6. In a forge, the combination of the bracket *m*, having the horizontal arm *n* with the open socket-seat *o p*, with a lever having a ball-and-stem portion adapted to fit the socket-seat.

7. In a forge, the combination of the bracket *m*, having the arm *n* and open socket-seat *o p*, with the hinged cap adapted to cover the ball portion of the ball-and-socket fulcrum in the socket-seat, substantially as specified.

8. An operating-lever connected with driving mechanism for forges, furnaces, &c., and provided with a ball-and-socket fulcrum.

In testimony whereof I affix my signature in presence of two witnesses.

JAMES F. WINCHELL.

Witnesses:

PHILIP C. MASI,
M. P. CALLAN.